(12) United States Patent
Venkitaraman et al.

(10) Patent No.: US 9,767,768 B2
(45) Date of Patent: Sep. 19, 2017

(54) AUTOMATED OBJECT SELECTION AND PLACEMENT FOR AUGMENTED REALITY

(71) Applicant: General Instrument Corporation, Horsham, PA (US)

(72) Inventors: Narayanan Venkitaraman, Palatine, IL (US); Santosh S. Basapur, Hanover Park, IL (US); Shirley A. Chaysinh, Grayslake, IL (US); Young S. Lee, Palatine, IL (US); Hiren M. Mandalia, Elk Grove Village, IL (US); Van M. Vuong, Chicago, IL (US)

(73) Assignee: ARRIS Enterprises, Inc., Suwanee, GA (US)

( * ) Notice: Subject to any disclaimer, the term of this patent is extended or adjusted under 35 U.S.C. 154(b) by 746 days.

(21) Appl. No.: 13/723,176

(22) Filed: Dec. 20, 2012

(65) Prior Publication Data
US 2014/0176604 A1    Jun. 26, 2014

(51) Int. Cl.
| | |
|---|---|
| G09G 5/00 | (2006.01) |
| G09G 5/377 | (2006.01) |
| G06F 3/147 | (2006.01) |
| G02B 27/01 | (2006.01) |
| G06F 17/30 | (2006.01) |

(52) U.S. Cl.
CPC ............ *G09G 5/377* (2013.01); *G02B 27/01* (2013.01); *G06F 3/147* (2013.01); *G06F 17/30061* (2013.01); *G02B 2027/014* (2013.01); *G02B 2027/0138* (2013.01); *G02B 2027/0141* (2013.01)

(58) Field of Classification Search
USPC ........................................................ 345/633
See application file for complete search history.

(56) References Cited

U.S. PATENT DOCUMENTS

| | | | |
|---|---|---|---|
| 5,729,471 A * | 3/1998 | Jain et al. ...................... | 725/131 |
| 8,175,617 B2 | 5/2012 | Rodriguez | |
| 8,180,396 B2 | 5/2012 | Athsani et al. | |
| 8,531,451 B2 * | 9/2013 | Mital et al. .................... | 345/419 |
| 2011/0145068 A1 * | 6/2011 | King et al. .................. | 705/14.55 |
| 2011/0164163 A1 * | 7/2011 | Bilbrey et al. ........... | 348/333.01 |
| 2011/0184807 A1 | 7/2011 | Wang et al. | |
| 2011/0185381 A1 | 7/2011 | Wang et al. | |
| 2011/0185384 A1 | 7/2011 | Wang et al. | |

(Continued)

OTHER PUBLICATIONS

Y. Huang, "Virtual Ads Insertion by Scene Analysis for Augmented Reality", Image Formation and Processing Group, University of Illinois at Urbana-Champaign, available at <www.ifp.illinois.edu/~yuhuang/Adsinsertion_sceneanalysis.html>, retrieved Dec. 12, 2012.

(Continued)

*Primary Examiner* — M Good Johnson
(74) *Attorney, Agent, or Firm* — Stewart M. Wiener

(57) ABSTRACT

A system to facilitate AR processing includes receiving captured media from a user device and context information relating to media that is being delivered to a receiving device. The system may use the media being delivered with the captured media to generate one or more virtual objects. The user device may augment a user's view of reality that is reflected in the captured media by overlaying or otherwise incorporating the virtual objects in the user's view of reality.

24 Claims, 10 Drawing Sheets

(56) References Cited

U.S. PATENT DOCUMENTS

| | | | |
|---|---|---|---|
| 2012/0120101 | A1 | 5/2012 | Adhikari et al. |
| 2012/0180084 | A1 | 7/2012 | Huang et al. |
| 2012/0242900 | A1 | 9/2012 | Huang et al. |
| 2012/0256954 | A1* | 10/2012 | Soon-Shiong ............... 345/633 |
| 2014/0063055 | A1* | 3/2014 | Osterhout et al. ............ 345/633 |

OTHER PUBLICATIONS

Y. Huang, et al., "Virtual ads insertion in street building views for augmented reality", 18th IEEE International Conference on Image Processing (ICIP) 2011, Brussels, Belgium, IEEE, Sep. 2011.

L Bordes, et al., "Adaptive Object Placement for Augmented Reality Use in Driver Assistance Systems", Proceedings of the 8th European Conference for Visual Media Production, London, Nov. 2011.

D. Breen, et al. "Interactive Occlusion and Automatic Object Placement for Augmented Reality", Computer Graphics Forum. vol. 15. No. 3. Blackwell Science Ltd, 1996.

B. Leibe, et al. "Dynamic 3d scene analysis from a moving vehicle." Computer Vision and Pattern Recognition, CVPR'07. IEEE Conference on. IEEE, Jun. 2007.

\* cited by examiner

- <ARM><MAX ITEMS> 3 </MAX ITEMS><MIN INTERVAL> 60s </MIN INTERVAL>
- <ITEM ID=I 1 PRIORITY=1 URL= "HTTP://XYZ/RADIO.3DI" TYPE= "3DIMG" DURATION=30SEC>
- <SELECTIONCONDITIONS>
- <SELECTIONCONDITION ID=SC 11>
- <MEDIA CONTEXT> <TIME REQUIRED=TRUE> "2:30-3:30" </TIME> </MEDIA CONTEXT>
- <USER CONTEXT> <COMMENT TYPE= "CONTAINS ONE OF" REQUIRED=FALSE> RADIO, WWII NEWS </COMMENT><PRIORITY> 3 </PRIORITY></USER CONTEXT>
- <SELECTIONCONDITION>
- <SELECTIONCONDITIONS>
- <PLACEMENTCONDITIONS>
- <PLACEMENTCONDITIONS ID= "PC 11" >
- <OBJECT TYPE=SURFACE ORIENTATION=HORIZANTAL MIN=15 IN MAX=23 IN TRANSFORM= "SCALETOFIT" ></OBJECT>
- </PLACEMENTCONDITIONS>
- <TRIGGERS>
- <ONSELECT> HTTP://XYZ/CALLBACK.JS </ONSELECT>
- <ONDISPLAY> HTTP://XYZ/TRANS.JS </ONDISPLAY>
- </TRIGGERS>
- </ITEM>
- </ITEM ID=I2 PRIORITY=2 URL= HTTP://XYZ/CRACK.JS TYPE= "TRANSFORM" >
- <SELECTIONCONDITIONS>
- <SELECTIONCONDITION ID=SC 21>
- <MEDIA CONTEXT><EVENT>HOME RUN</EVENT> </MEDIA CONTEXT>
- <SELECTIONCONDITION>
- <SELECTIONCONDITIONS>
- <PLACEMENT CONDITIONS>
- <PLACEMENTCONDITIONS ID= "PC 21" >
- <OBJECT TYPE=*></OBJECT>
- </PLACEMENTCONDITIONS>
- </ITEM>
- </ITEM ID=I3 PRIORITY=3 URL=HTTP://XYZ/PANO*.JPG TYPE= "PANORAMIC BACKGROUND" ><SELECTION CONDITION ID=SC31>
- <MEDIA CONTEXT><TIME> "2:30-3:30" </TIME></MEDIA CONTEXT></SELECTION CONDITION>/ITEM>
- </ARM>

FIG.5A

- <UNM>
- <PRIMARY TYPE=TV>
- <LOCATION MODE=RELATIVE>
- <LONGITUDE> 2 </LONGITUDE>
- <LATITUDE>-5</LATITUDE>
- <ALTITUDE>-1</ALTITUDE>
- </LOCATION>
- <SIZE>40" </SIZE>
- <MODEL>XYZ</MODEL>
- </PRIMARY>
- <COMPANION TYPE=GOGGLE>
- <ORENTATION>
- <ROLL> 180 </ROLL><TILT> 270 </TILT><HEADING> 20 </HEADING>
- </ORIENTATION>
- <MODEL>GOOGLE GLASS 2</MODEL>
- </COMPANION>
- </OBJECTS>
- <!--IDENTIFIED OBJECTS <TABLE>, <FISHTANK>, <CLOCK>, <PAINTING>, <COKE CAN> ETC. -->
- <OBJECT ID=RO 1 TYPE=REAL><LOCATION></LOCATION></OBJECT>,
- <OBJECT ID=VO 1 TYPE=VIRTUAL SRCUSERID=U2></OBJECT>
- <OBJECT ID=S 1 TYPE=SURFACE ORIENTATION=HORIZANTAL SIZE=16 IN></OBJECT>
- </OBJECTS>
- <USERS>
- <USER ID=a 123 TYPE=VIEWER MODE=ONSITE><MOOD SOURCE=SELF REPORTREPORTTIME=600s></MOOD></PERSON>
- <PERSON ID=b 234 MODE=ONLINE></PERSON>
- </PERSONS>
- </UNM>

FIG. 5B

AUTOMATED OBJECT SELECTION AND PLACEMENT FOR AUGMENTED REALITY

BACKGROUND

Augmented reality (AR) refers to the combination of a captured real-world environment with computer-generated data, thus creating an "augmented" view of the captured real-world environment. Typically, the computer-generated data is based on the captured real-world environment. A common use of AR appears in televised sporting events. For example, in a football game, the broadcaster may overlay an image of a line that represents the first down on a view of the football field. As another example, video capture of an object using a mobile device camera may provide more information about the object overlaid on the video. The proliferation of mobile computing devices such as smart phones, computer tablets, and the like has created opportunities for bringing the AR experience to users of mobile computing devices.

BRIEF DESCRIPTION OF THE DRAWINGS

FIGS. 5A and 5B illustrate examples of metadata information in accordance with the present disclosure.

DETAILED DESCRIPTION

In accordance with the present disclosure a method for augmented reality may include accessing information relating to media being delivered to a receiving device and information relating to media generated by a user device. A first object and transforms on the first object may be determined based on the media being delivered to the receiving device. The user device may receive information to render images of the first object in a field of view seen by the user using the user device.

In accordance with the present disclosure, a computer device may include program code to control an image capturing device (e.g., digital camera) to generate a first media stream. Information relating to the first media stream may be provided to a server system. The computer device may receive from the server system data relating to a virtual object identified in the server system using the information received from the computer device, along with information relating to a second media stream that is being delivered to a receiving device. The computer system may generate images of the virtual object using the received data, and present the images in a field of view of the user by displaying the images on an output device.

In accordance with the present disclosure, a non-transitory computer-readable storage medium may store a computer executable program. The computer executable program may cause a computer to receive from a user device first information relating to a first media stream captured at the user device. Using second information relating to a media stream that is delivered to a receiving device, the computer may identify a first object. The computer may determine transformational information using the first and second information. The computer may provide object rendering information and the transformational information to the user device to render images on the user device.

Embodiments in accordance with the present disclosure will now be discussed in connection with the accompanying figures.

Figure 1:
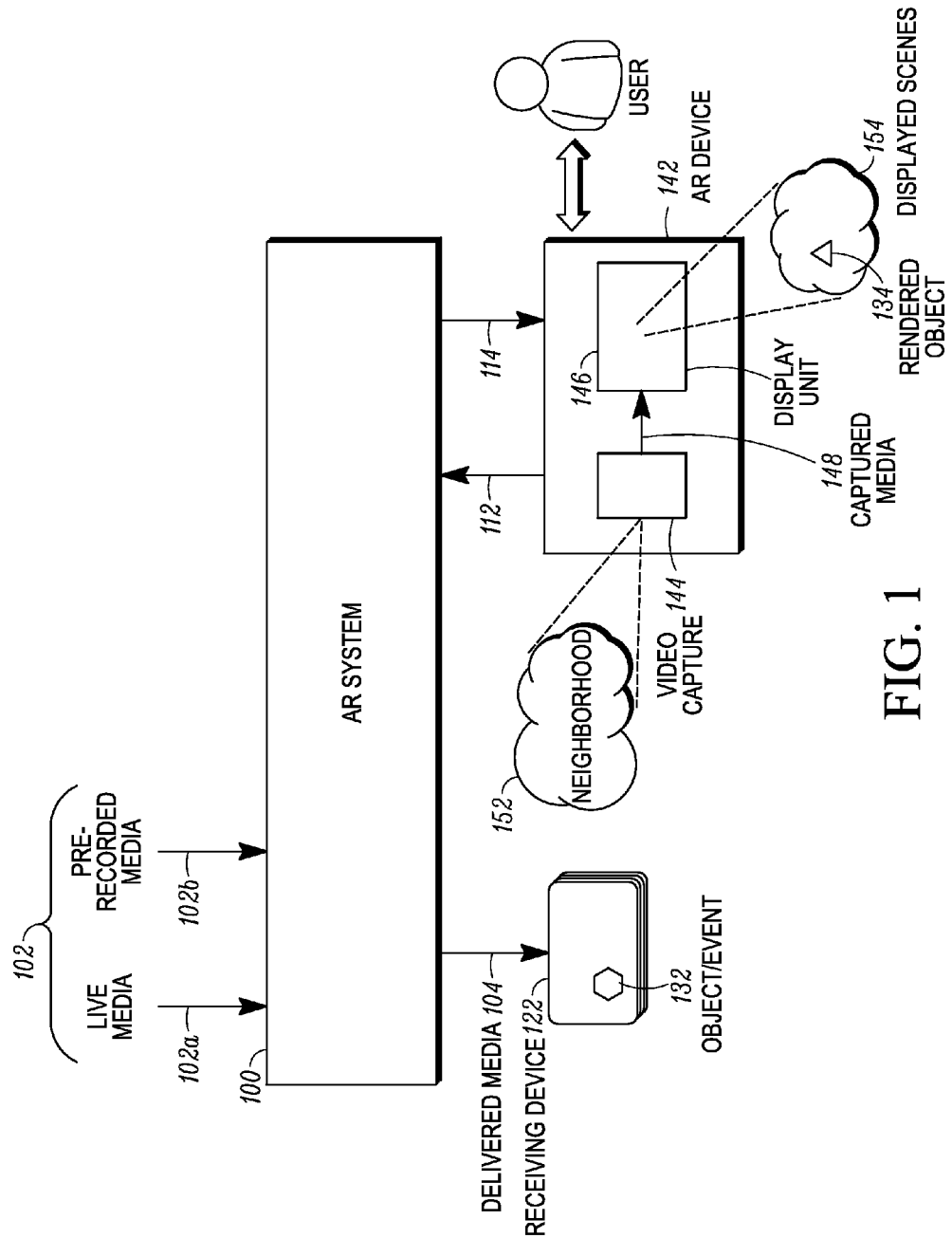
FIG. 1 illustrates an augmented reality configuration in accordance with the present disclosure.

Referring to FIG. 1, an augmented reality (AR) system 100 in accordance with some embodiments of the present disclosure may receive a media stream 102 for delivery to a receiving device 122. The media stream 102 may be a live media feed 102*a* such as a sporting event, a news broadcast, a teleconferenced slide show presentation, and in general may be live video from any source. The media stream 102 may be pre-recorded media 102*b*, such as a television show, a movie, music, a digital e-book that is being viewed on an e-book reader, or any other pre-recorded material. For the purposes of the present disclosure, the pre-recorded media 102*b* may include computer-generated media streams; e.g., the media stream generated by a computer game during game play. The receiving device 122 may be any suitable display device such as a television, a monitor on a computer system, a display on a hand held device (e.g., smartphone, computer tablet), a head-mounted display, and so on. The AR system 100 may deliver the media stream 102 to the receiving device 122 as delivered media stream 104, for example, via wired or wireless networks such as a WiFi® network, a cable network, 4G network etc.

The AR system 100 may communicate with an companion device 142. Typical examples of an companion device 142 include smartphones, computer tablets, and the like. The companion device 142 may include a video capture unit 144 and a display unit 146. For example, the companion device 142 may be a smartphone that has a built-in camera and a built-in display, or a head-mounted display. The video capture unit 144 may capture the neighborhood (e.g., a user's surroundings) 152 of a user of the companion device 142 and generate a captured media stream 148 comprising images, video, audio, etc. The video capture unit 144 may deliver the captured media stream 148 to the display unit 146, which may then present the captured media stream to the user as displayed scenes 154 of the user's neighborhood 152.

In accordance with the present disclosure, the companion device 142 may provide the captured media stream 148 to the AR system 100 in the form of information 112. In some embodiments, for example, the information 112 may be the captured media stream 148 itself; e.g., image data, video data, etc. In other embodiments, the information 112 may be data extracted from an analysis of the captured media stream 148, or data that otherwise relates to information contained in the captured media stream 148 (sometimes referred to as metadata).

In accordance with the present disclosure, the AR system 100 may identify one or more virtual objects using the information 112 received from the companion device 142 and objects or events 132 contained in the delivered media stream 104 that is provided to the receiving device 122. The AR system 100 may provide to the companion device 142 information 114 that describes or otherwise characterizes the identified virtual objects. As will be explained in more detail below, the companion device 142 may render the identified virtual objects as rendered virtual objects 134 in accordance with the information 114 received from the AR system 100. The companion device 142 may present the rendered virtual objects 134 in the user's field of view by overlaying or otherwise incorporating the rendered virtual objects in the displayed scenes 154, thus augmenting the user's reality, vis-à-vis the displayed scenes 154, with the rendered virtual objects.

In some embodiments, the receiving device 122 and the companion device 142 may be the same device. For example, a display on a computer tablet may be divided into a first portion that displays the received media stream 104, and a second portion that shows the augmented video. In some instances, the companion device 142 may render the virtual objects 134 immediately in user's field view and in some other instances, the virtual objects may be rendered if and only if the user's field of view satisfies certain criteria, such as user's field of view is heading north and up, or there is a second object in the user's field of view, etc.

Figure 2:
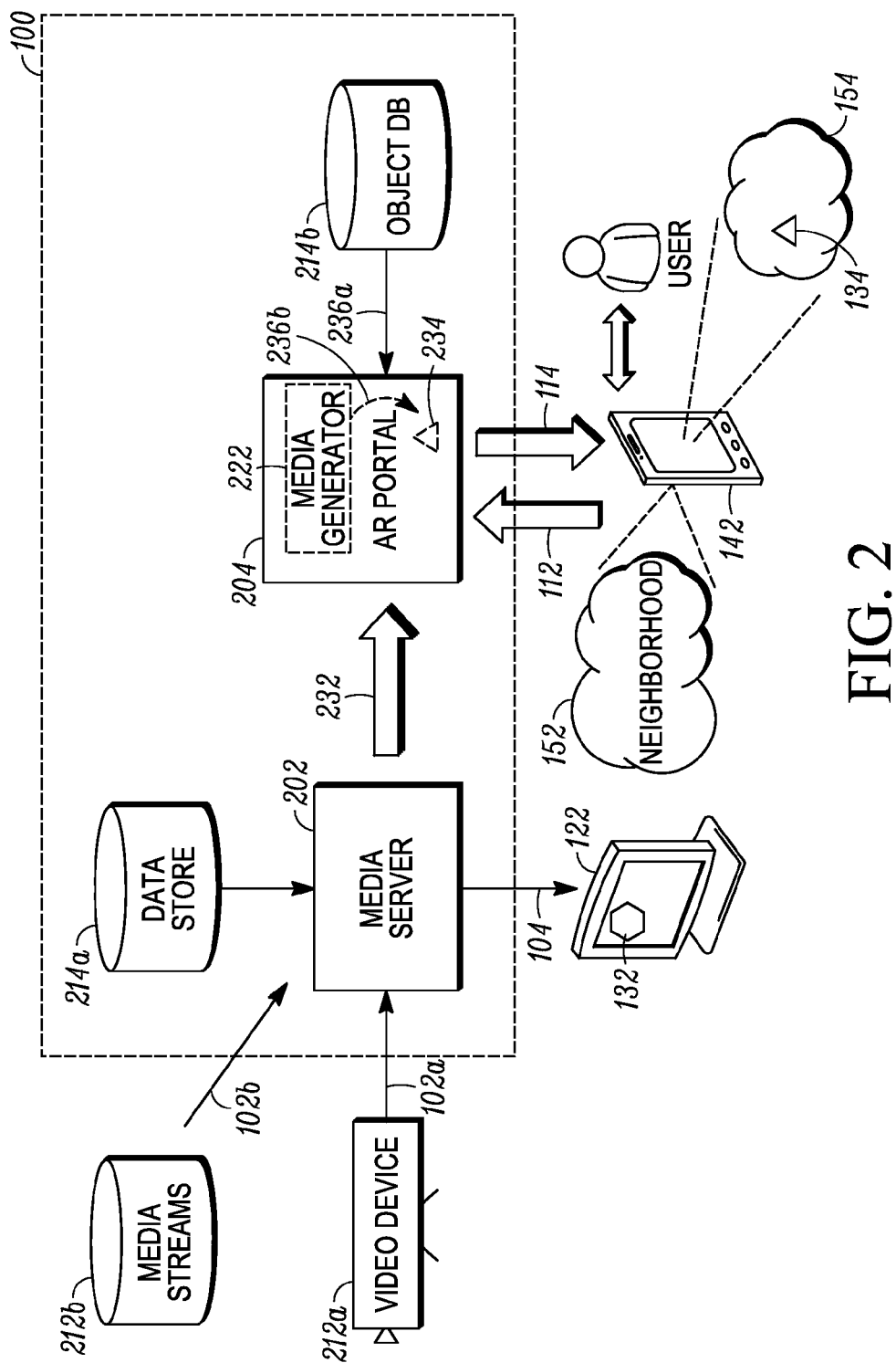
FIG. 2 illustrates another embodiment of an augmented reality configuration.

Referring to FIG. 2, in some embodiments the AR system 100 may comprise a media server 202 and an AR portal 204. The media server 202 may access media streams such as live media feeds 102a (e.g., captured by a video recording device 212a) or pre-recorded media 102b stored on a data store 212b of pre-recorded media streams. The media server 202 may deliver media streams 102a, 102b to the receiving device 122 as delivered media stream 104. In some embodiments, the video recording device 212a may deliver content directly to the receiving device 122, and in other embodiments, the video recording device 212a may deliver content to the media server 202 and to the receiving device 122.

The AR portal 204 may communicate with the media server 202. In some embodiments, the media server 202 may detect objects or events 132 contained in the delivered media stream 104. The media server 202 may provide information that describes the detected objects or events 132 to the AR portal 204 in the form of media context information 232.

Figure 2A:
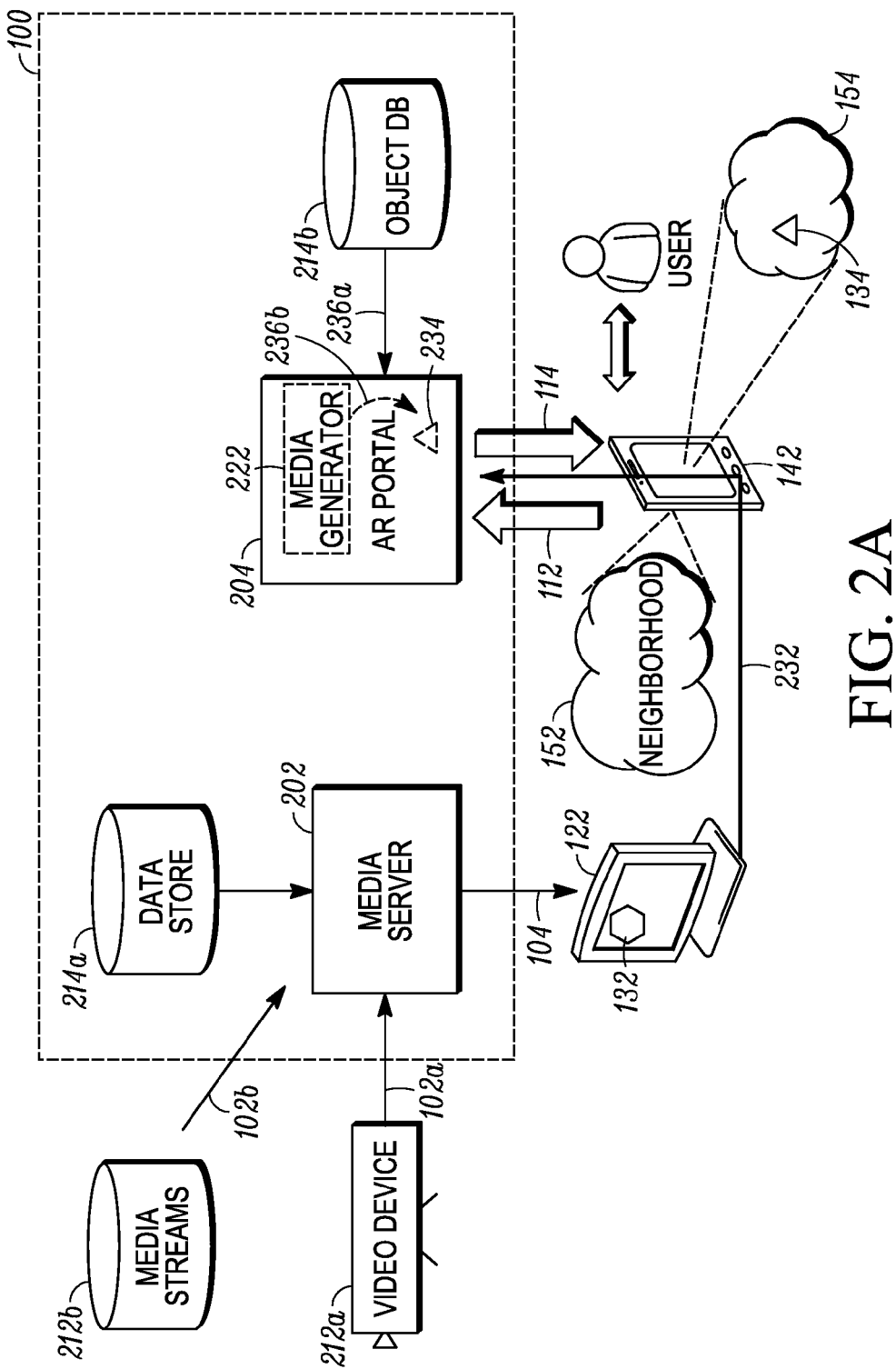
FIG. 2A illustrates yet another embodiment of an augmented reality configuration.

Referring for a moment to FIG. 2A, in some embodiments the AR portal 204 may receive the media context information 232 via the companion device 142 instead of from the media server 202. For example, the receiving device 122 may include a set top box (STB) or a streaming device such as the Motorola Televation® streaming device. The companion device 142 may determine the program that a user is consuming at the receiving device 122 by using any suitable communication scheme, for example, using local communication via standards defined by Digital Living Network Alliance (DLNA) or via audio/video signatures, and so on. The companion device 142 may obtain information such as the name/Id of the program, program position etc. In some embodiments, the companion device 142 may obtain additional information such as ids and meta information of objects encoded in the delivered media stream 104, for example in the form of digital water marks. Such information may then be provided to the AR portal 204 as media context information 232.

Continuing with FIG. 2, the AR portal 204 may further communicate with the companion device 142, as explained above in connection with FIG. 1, to receive information 112 from the companion device. The AR portal 204 may identify one or more virtual objects 234 using the media context information 232 received from the media server 202 and information 112 received from the companion device 142. In some embodiments, the virtual objects 234 may be objects that appear in the delivered media stream 104. In other embodiments, the virtual objects 134 may be related to objects that appear in the delivered media stream 104, but themselves do not appear in the delivered media stream. For example, if the delivered media stream 104 includes images of a zombie (object 132) that appear in a horror film (delivered media stream 104), the virtual objects 234 may be the zombie that appears in the horror film or may be a skeleton, which is an object related to the zombie but does not appear in the horror film.

The AR portal 204 may provide to the companion device 142 information 114, which describes and otherwise characterizes the identified virtual objects 234. The information 114 may include object rendering data that represent the virtual objects 234 so that the companion device 142 can render them. In some embodiments, where the virtual objects 234 appear in the delivered media stream 104, the object rendering data may be obtained from the delivered media stream. In other embodiments, where the virtual objects 234 do not appear in the delivered media stream 104 but are related to objects that appear it delivered media stream, an objects data store 214b may store object rendering data 236a for rendering the related objects. In still other embodiments, instead of, or in addition to, the objects data store 214b, the AR portal 204 may include a media generator 222 that produces computer-generated object rendering data 236b to represent virtual objects 234 that do not appear in the delivered media stream 104.

Figure 3:
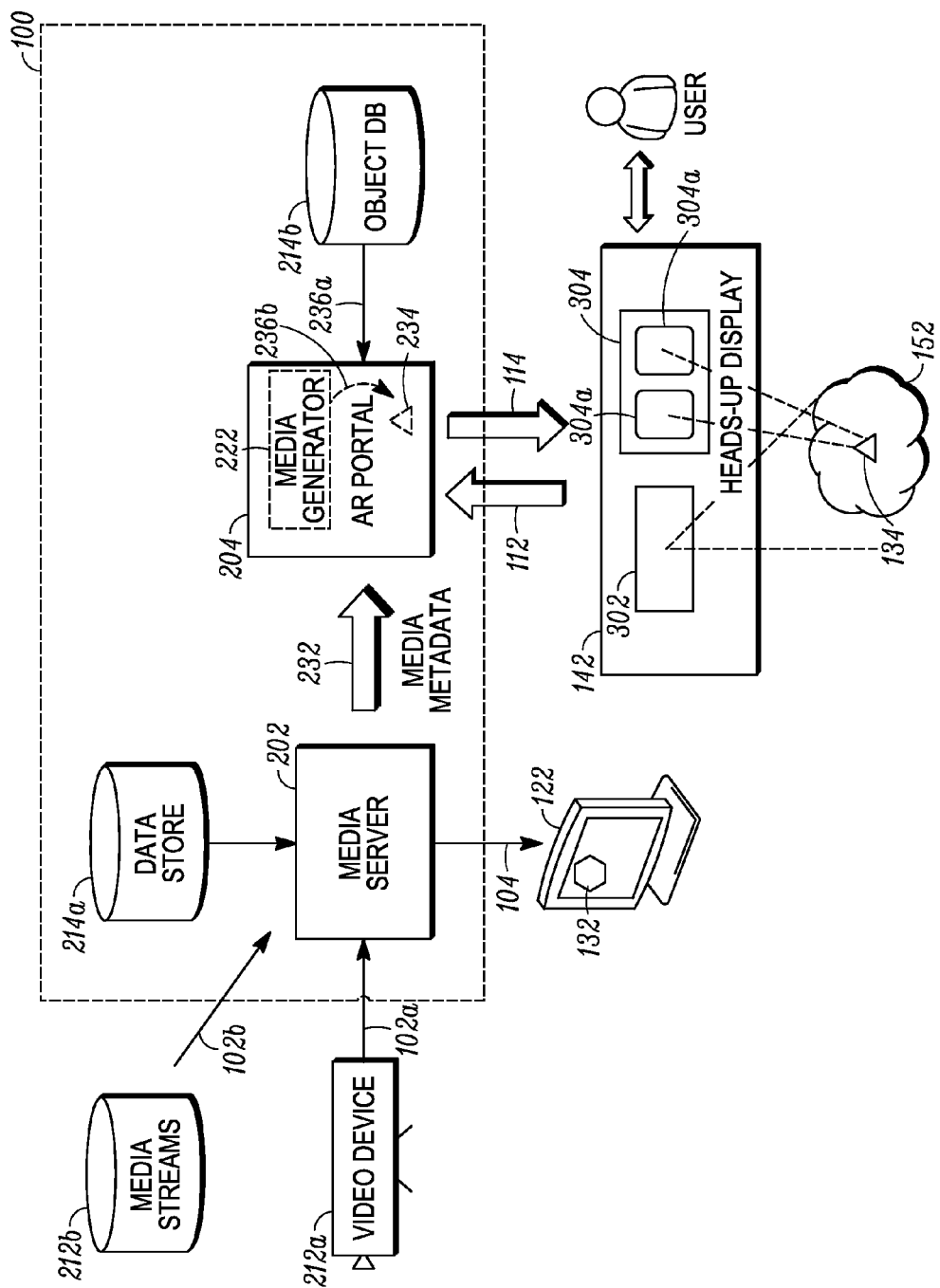
FIG. 3 illustrates an augmented reality configuration using a heads-up device.

Referring to FIG. 3, in some embodiments, the companion device 142 may be a kind of heads up display (e.g., virtual reality (VR) goggles worn by the user) having an image capturing device 302 and a display portion 304. The image capturing device 302 may capture media, such as video and/or audio, of the user's neighborhood 152 as the user moves about, and provide the captured media stream 148 to the AR system 100 as information 112. The display portion 304 may comprise transparent eye pieces 304a that allow the user to directly view their neighborhood 152 by looking through the transparent eye pieces 304a. The transparent eye pieces of the display portion 304 may include active display elements (e.g., LCD or LED elements) so that images can be generated directly on the transparent eye pieces. The companion device 142 may render the virtual objects 134 on the display portion 304 using the information 114 received from the AR system 100, thus overlaying or superimposing images of the virtual objects 134 on the user's field view.

Figure 4:
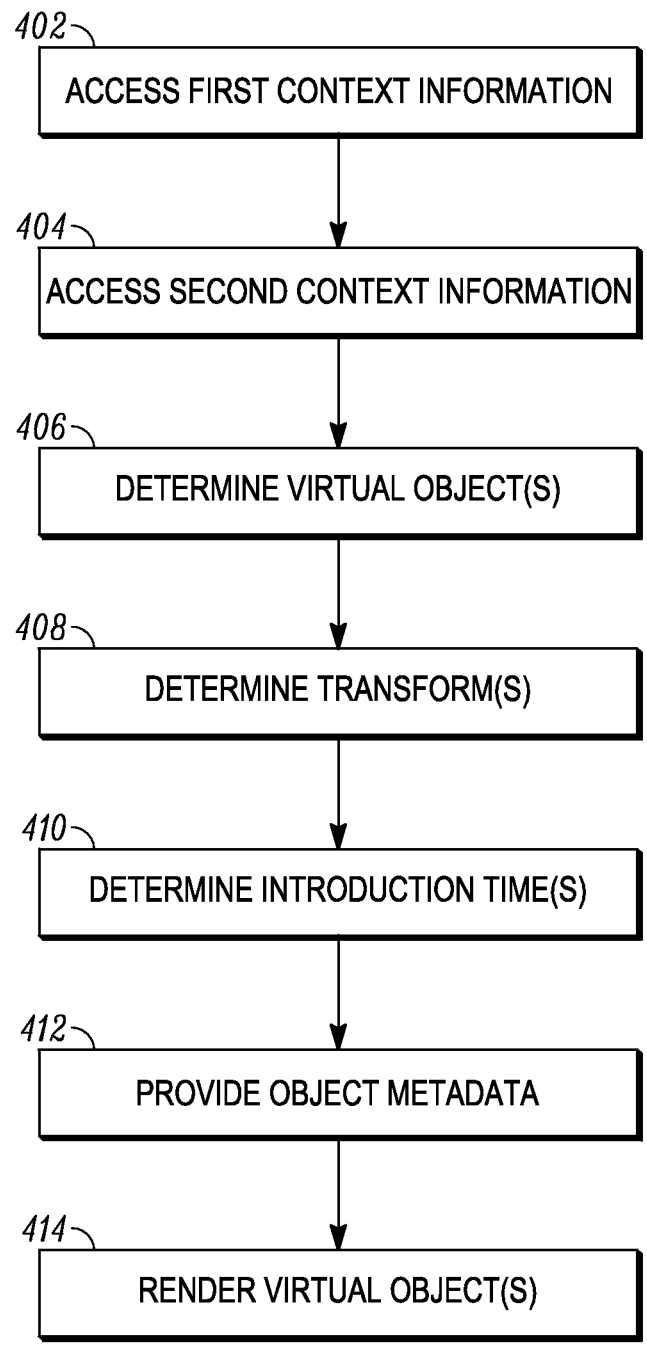
FIG. 4 is a workflow in accordance with the present disclosure.

Referring to FIG. 4, a workflow of the AR system 100 in accordance with the present disclosure will now be described. At block 402, the AR system 100 may access first context information (e.g., 232, FIG. 2) that is based on the content of the delivered media stream 104 that is delivered to the receiving device 122. The first context information may specify the activity that is occurring in the delivered media stream 104 (e.g., a battle scene, a baseball game, etc.), objects that are identified in the delivered media stream (e.g., characters and weaponry in the battle scene, players in the baseball game, etc.), events that are taking place, and so on. Merely as an example, suppose the delivered media stream 104 is a space battle scene in a movie. The first context information in this example may include the spaceships that are flying around in the scene, state information such as whether the spaceships are firing weapons or exploding, the trajectories of the spaceships' flight paths, and so on. As another example, suppose the delivered media stream 104 is a live feed of a baseball game. The first context information in this example may include identities of the players in the game, the current score, events such as a home run being hit, and so on.

In some embodiments, the media server 202 may include context analysis software to identify the first context information from the delivered media stream 104. The context analysis may be performed in real time for a live media feed 102a. In some embodiments, the context analysis software may be user-authored AR experience meta information (ARM), which for example may be stored in a data store 214a. The ARM may define objects, events, and other context information to direct the context analysis software to "look" for such objects, events, and other contexts in the delivered media stream 104.

Referring for a moment to FIG. 5A, the figure illustrates an example of the ARM in accordance with some embodiments. In some embodiments, the ARM may be expressed using the extended markup language (XML) syntax, or other similar syntax. The ARM may comprise a sequence of possible virtual objects 134, their type, URL, the conditions that need to be satisfied (based on the meta data from user neighborhood 152 and the media context information 232) for those virtual objects to be chosen, when and where the object is placed in the view of the user and the actions that need to be performed at different stages of the object display cycle (such as when selected for display, when object is rendered, during rendering and when the object is removed). In addition to individual object information, the ARM may have global information such as limits on the number of objects that may be shown at a given time, limits on minimum delay between introductions of a new object etc. The ARM may also have a complex configuration such as with object embedded inside objects, indicating that an inner object is chosen only if the outer object is chosen.

In the example of the ARM shown in FIG. 5A, the id is a unique identifier of the object, and the priority represents the selection priority; i.e., if multiple items may be chosen and if there is a limit on how many can be chosen, the item(s) with higher priority would be chosen. The universal resource locator ("URL") specifies the location to obtain the necessary resources to render this item, the duration gives the time for which this item will be show. The type indicates the item type such as, for example, if the item is an image, video, panoramic background, or transform. While an image may be static or an animated image, a transform could comprise scripts that can modify the view of preexisting items in the neighborhood 152 such as altering, removing or replacing an existing item in the neighborhood of a user. For example, a transform may be used to alter the color of a wall or a transform script may be used to provide the illusion of a crack on an existing item.

Continuing with the example in FIG. 5A, there are selection conditions which need to be satisfied to enable the system choose an item. The selection conditions may be based on media context such as item interval in the media or event(s) in the delivered media stream 104. Events may be detected by using any of a number of known techniques, such as analyzing video, audio, closed-caption, social feeds related to the delivered media stream 104, and so on. For instance, a "home run" event may be determined by analyzing the closed caption along with a change in the tonal quality of audio and sentiment analysis. Changes in social media feeds such as twitter may also be used to determine events. The allowed events in one embodiment may be from an ontology of pre existing events.

The placement condition determines if the item may be selected based on the user neighborhood context. For example, a radio may be chosen only if there is a horizontal flat surface in the user neighborhood 152 with a minimum amount of free space. Also, when placing an item, transforms such as scale to fit, or multiply by repeating (such as multiplying raindrops to create illusion of rain) may be used. Finally, the item may have triggers which invoke scripts written in JavaScript or Python, for example. The scripts may be used to animate the video, to enable a user interact with items, provide call backs to AR portal 204, etc.

Returning to FIG. 4, a similar real time context analysis may be performed in pre-recorded media 102b as it is being delivered to the receiving device 122. In some embodiments, the pre-recorded media 102b may be pre-analyzed to identify objects, events, and context contained in the pre-recorded media in an offline manner. This may be desirable, for example, in order to reduce processing load in the media server 202. The identified objects, events, and context may be stored as metadata information. As the media server 202 delivers the pre-recorded media 102b to the receiving device 122, the media server 202 may access corresponding metadata information and provide it to the AR portal 204, without having to perform the context analysis.

At block 404, the AR system 100 may access second context information that is based on the content of captured media stream 148 captured by the companion device 142. The captured media stream 148 may be video of the user's neighborhood 152. In some embodiments, the captured media stream 148 may be panoramic images, or a 3D model of the user's neighborhood 152.

In some embodiments, the information 112 may comprise the captured media stream 148 itself. The companion device 142 may provide the captured media stream 148 to the to the AR system 100 (e.g., the AR portal 204). The context analysis software in the AR system 100 may identify the second context information from the received captured media stream 148.

In other embodiments, the companion device 142 may perform the context analysis locally to produce the second context information. In some embodiments, the companion device 142 may generate the second context information using known image processing techniques to perform object detection and feature recognition to identify objects, their spatial locations, and other context in the captured media stream 148. The companion device 142 may provide the generated second context information to the AR system 100 in the form of information 112.

In some embodiments, the second context information may include the user's interactions with the companion device 142. For example, if the companion device 142 includes a motion sensor, the user may shake the companion device to indicate a significant event in the captured media 148. The user may touch an object, which is then recorded in the captured media stream 148. The user may receive a text message from a friend commenting on the delivered media stream 104, which the companion device 142 may detect and incorporate into the second context information.

At block 406, the AR system 100 may identify or otherwise determine one or more virtual objects (e.g., 234) to be presented on the AR component 142. The virtual objects 234 may be images, a sequence of images, animations, and so on. The virtual objects 234 may include audio.

In accordance with the present disclosure, the virtual objects 234 may be identified based on a comparison of the objects and events occurring the delivered media stream 104 (e.g., as represented in the media context information 232) and the objects and events occurring in the captured media stream 148 (e.g., as represented in information 112). In some embodiments the information 112 may be expressed as user neighborhood metadata (UNM).

Referring to FIG. 5B, the figure illustrates an example of UNM information. In some embodiments, the UNM may be expressed in an XML-type syntax. The UNM may include the location of the companion device 142 and the type of device. The location may be absolute coordinates or relative to the current user location. In one scenario, the location may be manually set once for a given user, cached and then reused. Alternatively, the location may be relative to the current location of the user. The UNM may include additional information about the companion device 142. Information about the companion device 142 may include the type of the companion device, the current orientation of the companion device, such as the value obtained using the orientation API available on platforms such as the Apple® iOS operating system and the Google® android OS.

Based on the analysis of the captured media 148, additional information may be dynamically obtained. These may comprise objects or surfaces that are identified in the captured media 148. Additionally, a given view may also contain virtual objects that have been placed in that location by other users. Note that while the "real" objects are determined using any of a number of well known image/video analysis and object detection techniques applied on the captured media 148, the virtual objects are determined using information provided by the AR portal 202 which may keep track of placement of virtual objects using information from other companion devices and based on the privacy settings of such virtual objects. Note that the information such as orientation of the companion device 142 and the objects in view may dynamically change as the user moves the companion device and that may then result in updates to the UNM when new objects are discovered or identified.

The neighborhood context may also contain other users who may be collocated or may be online and interacting with a user, there by forming a virtual neighborhood. Information about users may also comprise information about the user's obtained using manual reporting or via sensors. The objects in the UNM may be compared with the placement conditions in the ARM to determine if a virtual item may be chosen for display. For example, from the ARM in FIG. 5A, the item with id i1 may be chosen only at media time 2:30 to 3:30. If the user made some comments about radio, then the priority of choosing this is increased. Furthermore, there needs to be a matching surface available. Now in FIG. 5B, there is a matching surface available in UNM. So this item would be chosen with priority 1 if at time 2:30 if user made no comments about radio and with priority 3 if user made comments about radio.

Returning to FIG. 4, at block 408, the AR system 100 may compute or otherwise determine a set of transformational information (transforms) for each of the identified virtual objects 234. The transforms may specify spatial information of the virtual objects 234 with respect to the captured media stream 148 received from the companion device 142. The spatial information may specify a placement location of the virtual objects 234 in the user's field of view (e.g., displayed scenes 154). The spatial information may specify a trajectory of the virtual objects 234 across the user's field of view, including speed of motion.

The transforms may include geometric information such as scaling and perspective information that informs the companion device 142 how to render the virtual objects 234 in terms of its size relative to objects indentified in the captured media stream 148 and in terms of the perspective of the view represented in the captured media stream 148 so that the virtual object appears to belong in the user's neighborhood.

In some embodiments, the transforms may include temporal information such as when to render the virtual objects 234 in the user's field of view. In some embodiments, temporal information may include a duration of time that specifies how long the display of the virtual objects 234 remains in the user's field of view before the virtual object disappears from the user's field of view. Transforms may also include removing or changing a physical or virtual object in the user's neighborhood 152 when viewed using the companion device 142. For example, when there is a bird flying and leaving the scene in the delivered media stream 104, the bird may virtually enter user's space and pickup an object. That action may cause the object to be virtually removed from the neighborhood.

The transforms may include lighting conditions, color transformations, transparency, and other image processing factors. In some embodiments, the transforms may purposely distort the virtual objects 234 so that the virtual objects stand out in the user's field of view. In general, the transforms may include any kind of information that specifies imaging parameters, for rendering virtual objects 234 in the user's field of view.

Figure 6:
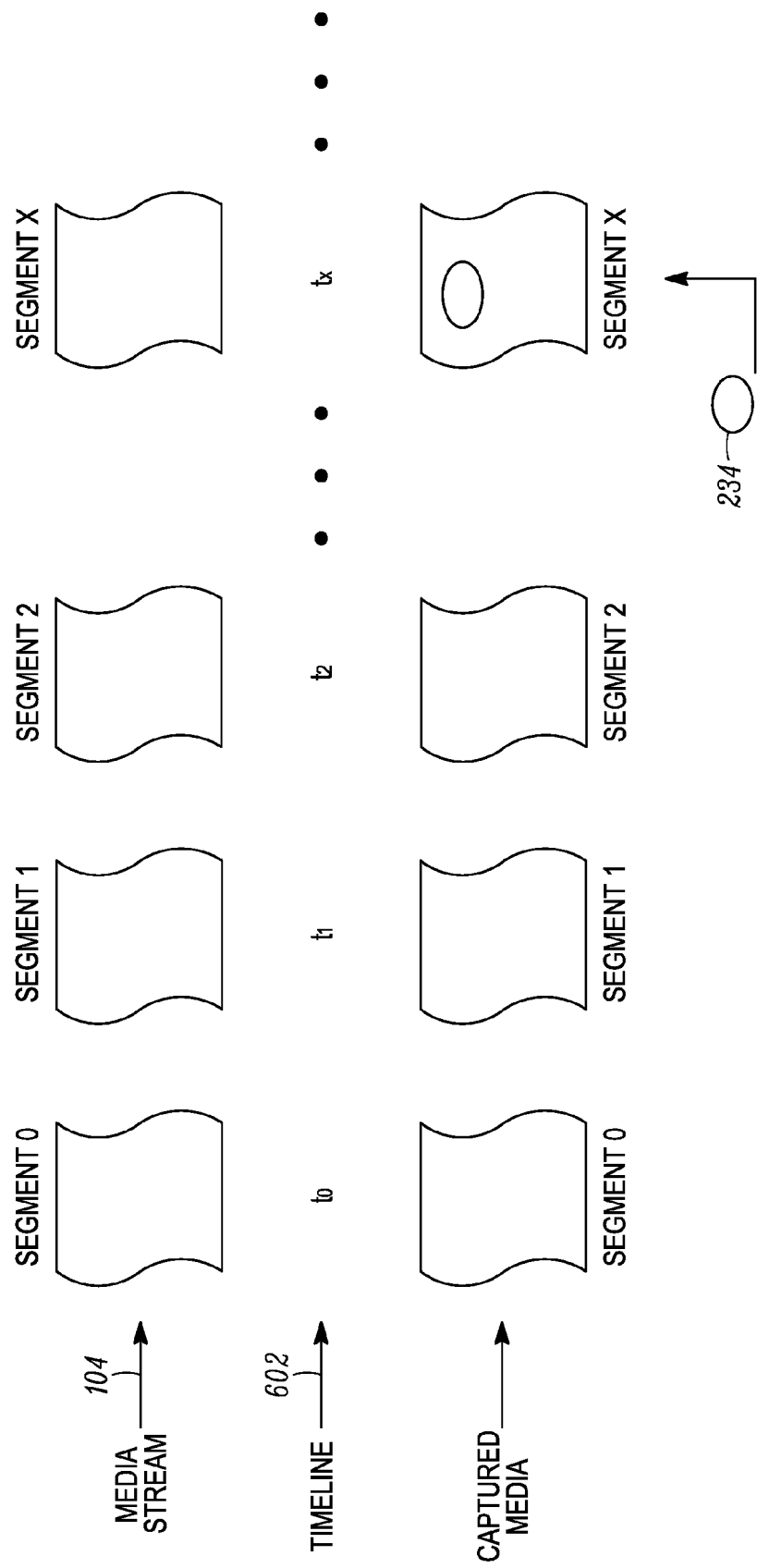
FIG. 6 illustrates synchronizing timelines between a delivered media stream and a captured media stream.

At block 410, the AR system 100 may identify or otherwise determine one or more points in time (times) in the media captured by the companion device 142 at which to introduce the identified virtual objects 234. Referring for a moment to FIG. 6, the delivered media stream 104 and the media captured by the companion device 142, each, may be represented as a succession of media segments, for example, numbered as segment 0, segment 1, and so on. A timeline 602 may be used to synchronize points in time in the delivered media stream 104 with points in time in the captured media stream 148. If the media is video, then each segment may be a successive image in the video. If the media is audio, then each segment may be samples of the audio.

In accordance with principles of the present disclosure, a time $t_x$ may be determined based on event(s) identified in the delivered media stream 104 that is delivered to the receiving device 122. For example, an event may be detected in segment x of the delivered media stream 104. The time $t_x$ associated with media segment x of the delivered media stream 104 may serve as a time relative to the timeline of the captured media stream 148 at which to introduce one or more of the identified virtual objects 234 into the user's field of view (e.g., by augmenting the displayed scenes 154). For example, the time $t_x$ identified in the delivered media 104 may be used to identify the same point in time in the captured media stream 148. Alternatively, the time $t_x$ may indicate a time two minutes later ($t_x$+2 minutes) in the captured media stream 148.

It will be noted that the processing of blocks 406, 408, and 410 need not occur in the order shown in FIG. 4. It will be appreciated that the order in which the AR system 100 processes the blocks 406, 408, and 410 may vary from one embodiment to another.

At block 412, the AR system 100 may provide object metadata to the companion device 142, for example, as information 114. The object metadata may include the transformational information determined in block 408 and timing information determined in block 410. The object metadata may further include the object rendering data to render the virtual objects 134 on the companion device 142. In some embodiments, the object rendering data may be image data that the companion device 142 can use to display virtual objects 134 in the user's field of view, for example, in the displayed scenes 154. In other embodiments, the object rendering data may be audio data that the companion device 142 can use to incorporate virtual objects 134 in the displayed scenes 154, for example, in the form of accompanying sound tracks. In still other embodiments, the object rendering data may be a combination of visual data and audio data.

In some embodiments, the object rendering data may be obtained from the delivered media stream 104; e.g., by extracting images or sound tracks from the delivered media stream 104. In other embodiments, the object rendering data may comprise images stored in a database of images such as the data store 214b. In still other embodiments, the object rendering data may be computer-generated data; e.g., generated by the media generator 222. Information about the rendered object may be provided back to the AR portal 204 and tracked in a database (not shown). This information may be provided to another companion device in the same location thereby enhancing the UNM corresponding to that companion device.

At block 414, the companion device 142 may render the virtual object on its display unit 146 to create an augmented reality experience for the user. Referring to FIG. 1, for example, the displayed scenes 154 presented on the display unit 146 may represent a field of view of the user's neighborhood 152. The companion device 142 may augment the user's field of view by superimposing renderings of the virtual objects 134 in the displayed scenes 154. As explained in FIG. 3, the companion device 142 may be embodied as a pair of virtual goggles. Here, the user's field of view is the user's neighborhood 152 as seen through the transparent eye pieces of the display portion 304. The companion device 142 may render the virtual objects 134 on the transparent eye pieces to augment the user's field of view with the virtual objects 134.

Figure 7:
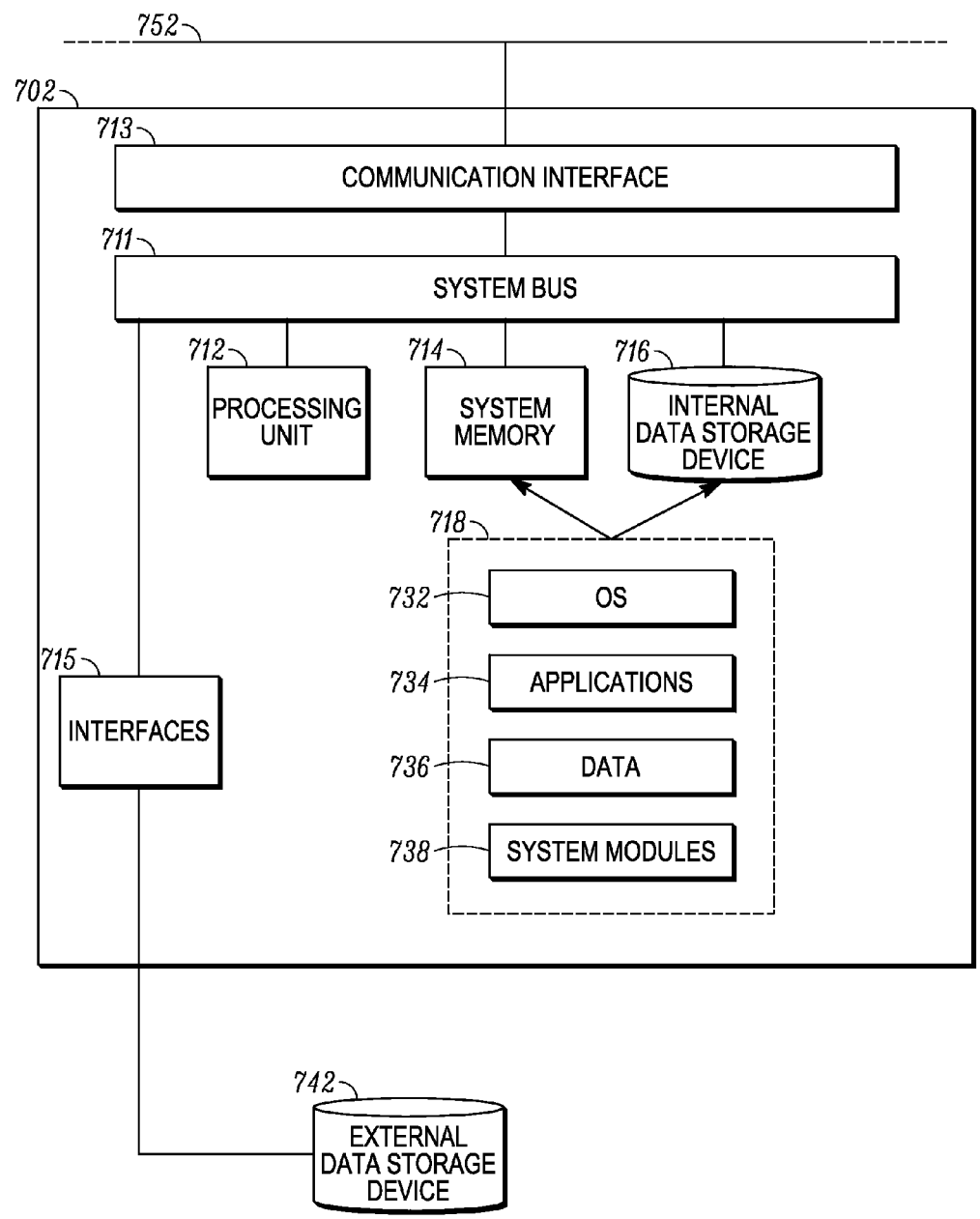
FIG. 7 is a block diagram of a computer system configured according to the present disclosure.

Referring to FIG. 7, an illustrative implementation of the AR system 100 may include a computer system 702 having a processing unit 712, a system memory 714, and a system bus 711. The system bus 711 may connect various system components including, but not limited to, the processing unit 712, the system memory 714, an internal data storage device 716, and a communication interface 713. In some embodiments, the computer system 702 may implement both the media server 202 and the AR portal 204. In other embodiments, the media server 202 and the AR portal 204 may be implemented as separate computer systems.

The processing unit 712 may comprise a single-processor configuration (e.g., a central processing unit, CPU), or may be a multi-processor architecture. The system memory 714 may include read-only memory (ROM) and random access memory (RAM). The internal data storage device 716 may be an internal hard disk drive (HDD), a magnetic floppy disk drive (FDD, e.g., to read from or write to a removable diskette), an optical disk drive (e.g., for reading a CD-ROM disk, or to read from or write to other high capacity optical media such as the DVD, and so on).

The drives and their associated non-transitory computer-readable media provide nonvolatile storage of data, data structures, computer-executable instructions, and so forth. Although the description of computer-readable media above refers to an HDD, a removable magnetic diskette, or a removable optical media such as a CD or DVD, it is noted that other types of non-transitory computer-readable media such as zip drives, magnetic cassettes, flash memory cards, cartridges, and the like, may also be used, and further, that any such media may contain computer-executable instructions for performing the methods disclosed herein.

The system memory 714 and/or the internal data storage device 716 may store a number of program modules, including an operating system 732, one or more application programs 734, program data 736, and other program/system modules 738. For example, in a computer system 702 that implements the media server 202 and the AR portal 204, the application programs 734 may provide media stream delivery services to a received device 122 and interact with an companion device 142 to process information 112 and 114 in accordance with FIG. 4. The application programs 734 may also include a media generating application 222 for computer-generated representations of virtual objects 234 identified by the AR portal 204.

An external data storage device 742 may be connected to the computer system 702. For example, in a computer system 702 configured as the media server 202, the external data storage device 742 may be the data store 212b of pre-recorded media 102b. In a computer system 702 configured as the AR portal 204, the external data storage device 742 may be the objects data store 214b.

The computer system 702 may operate in a networked environment using logical connections via wired and/or wireless communications to one or more remote computers (not shown) over a communication network 752. The communication network 752 may be a local area network (LAN) and/or larger networks, such as a wide area network (WAN).

Figure 8:
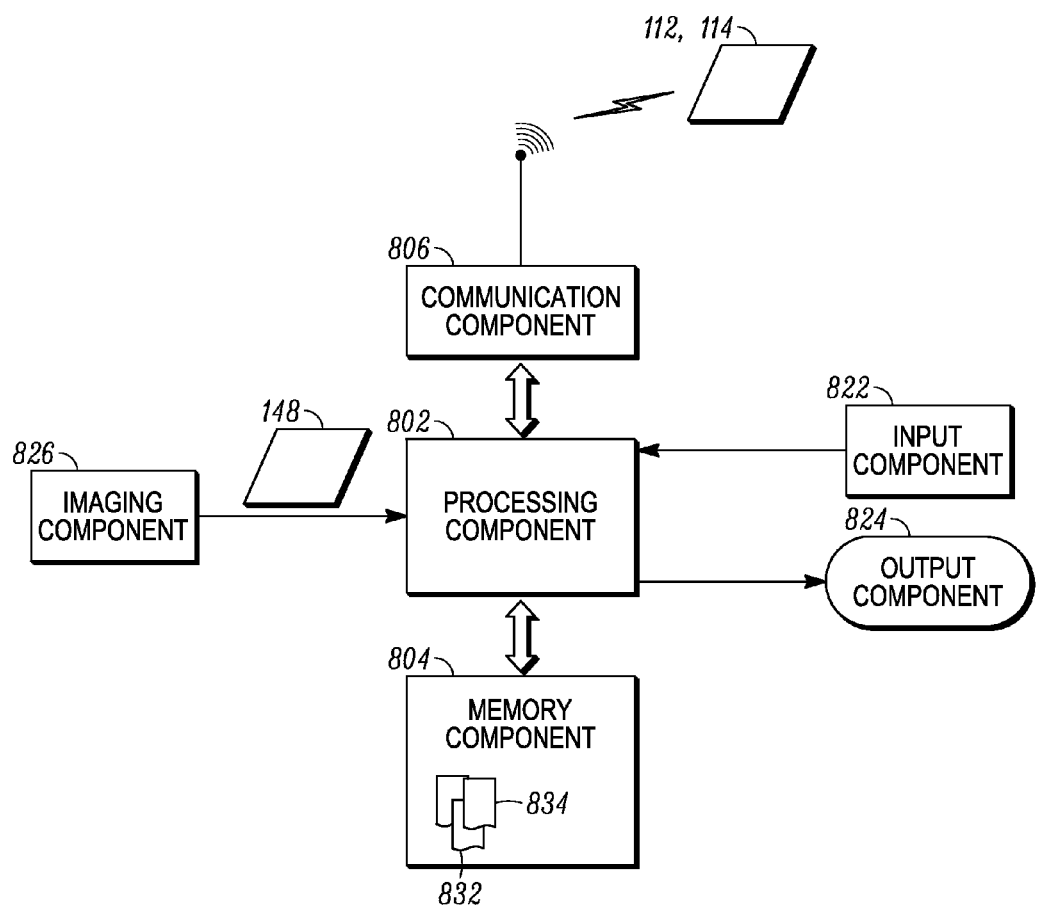
FIG. 8 is a block diagram of an companion device according to the present disclosure.

FIG. 8 shows a block diagram of a particular embodiment of the AR companion 142 in accordance with the present disclosure. The AR companion 142 may comprise a processing component 802 such as a CPU, a microcontroller, and the like. A memory component 804 may comprise static non-transitory memory (e.g., flash random access memory, RAM) and/or dynamic memory (dynamic random access memory, DRAM).

The companion device 142 may include an input component 822 and an output component 824. In some embodiments, the input component 822 and the output component 824 may be integrated in one component such as a touch-sensitive display. The companion device 142 may include an image capture component 826 (e.g., a camera) to produce the captured media stream 148.

The memory component 804 may store data and computer executable program code (apps) that the processing component 802 can execute to perform steps according to the present disclosure. For example, the memory component 804 may store an app 832 that analyzes the captured media stream 148 to produce information 112 that may then be communicated to the AR system 100. Another app 834 may receive information 114 from the AR system 100 and render virtual objects 134 for display on output component 824.

A communication component 806 may provide a suitable wireless communication channel to the AR system 100; e.g., the public switch telephone network (PSTN). The communication component 806 may support several wireless communication formats, including for example, Bluetooth, 3G, and so on, in addition to communication over the PSTN.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

The invention claimed is:

1. A computer-implemented method for augmented reality comprising a computer performing:
    accessing first context information that is based on content in a delivered media stream that is being delivered to a receiving device;
    accessing second context information that is based on content in a captured media stream representative of a neighborhood of a user device;
    determining a first virtual object using at least the first context information, wherein the first virtual object is based on the content in the delivered media stream;
    determining, using at least the second context information, and based at least on the content in the captured media stream, transformational information comprising at least one transformation to be performed on the first virtual object; and
    providing, to the user device, information representative of the first virtual object as transformed using the transformational information, wherein a field of view of the neighborhood seen using the user device is augmented with one or more images of the first virtual object by rendering the one or more images of the first virtual object using the information representative of the first virtual object as transformed using the transformational information.

2. The computer-implemented method of claim 1 wherein the first context information is further based on user-authored augmented reality experience metadata.

3. The computer-implemented method of claim 1 wherein the first virtual object is a representation of an object that appears in the delivered media stream.

4. The computer-implemented method of claim 1 wherein the first virtual object does not appear in the delivered media stream but is related to one or more objects that appear in the delivered media stream.

5. The computer-implemented method of claim 1 wherein the field of view of the neighborhood seen on the user device comprises a presentation of the captured media stream on the user device, wherein the presentation of the captured media stream includes the one or more images of the first virtual object rendered using the information representative of the first virtual object and the transformational information.

6. The computer-implemented method of claim 1 wherein the field of view of the neighborhood is seen using transparent eye pieces having active display elements disposed thereon to render the one or more images of the first virtual object.

7. The computer-implemented method of claim 1 wherein the captured media stream is associated with a timeline, the method further comprising determining a first time along the timeline, wherein the field of view of the neighborhood seen using the user device includes the one or more images of the first virtual object rendered at a time that is based on the first time.

8. The computer-implemented method of claim 1 wherein the captured media stream comprises video of the neighborhood of the user device captured by the user device.

9. The computer-implemented method of claim 1 wherein determining a first virtual object further includes determining the first virtual object using the second context information.

10. The computer-implemented method of claim 1 wherein determining a first virtual object is further based on events identified in the content of the delivered media stream or events identified in the content of the captured media stream.

11. The computer-implemented method of claim 1 wherein the delivered media stream is a pre-recorded media stream or a live media stream.

12. The computer-implemented method of claim 1 further comprising obtaining the information representative of the first virtual object from the content in the delivered media stream, or from a data store of images, or as a computer-generated representation of the first virtual object.

13. The computer-implemented method of claim 12 wherein the information representative of the first virtual object is an image or audio that is output on the user device.

14. The computer-implemented method of claim 1 wherein accessing the first context information comprises receiving the first context information from a media server that is delivering the delivered media stream to the receiving device.

15. The computer-implemented method of claim 1 wherein accessing the second context information comprises receiving the second context information from the user device.

16. A computer device comprising:
    a processing device;
    a non-transitory memory having stored thereon computer-executable program code;
    an output device;
    an image capturing device,
    wherein, when the processing device executes the computer-executable program code, the processing device:
    controls the image capturing device to generate a first media stream;
    receives the first media stream;
    provides information relating to the first media stream to a server system separate from the computer device;
    receives from the server system augmented reality (AR) data representative of virtual objects identified based on content in the first media stream and on content in a second media stream different from the first media stream;
    generates images of the virtual objects using the AR data and using transformational information comprising at least one transformation to be performed on the virtual objects; and
    presents the images of the virtual objects in a field of view of a user by displaying the images of the virtual objects, as transformed using the transformational information, on the output device.

17. The computer device of claim 16 further comprising the processing device providing information about the second media stream to the server system.

18. The computer device of claim 16 wherein the output device is a video display.

19. The computer device of claim 16 wherein the output device comprises transparent eye pieces having disposed thereon active display elements for generating the images of the virtual objects.

20. The computer device of claim 16 wherein the second media stream is being delivered to a receiving device.

21. The computer device of claim 20 wherein the receiving device is other than the computer device.

22. The computer device of claim 16 wherein the information relating to the first media stream that is delivered to the server system comprises the first media stream.

23. The computer device of claim 16 wherein, when the processing device executes the computer-executable program code, the processing device further generates context information from the first media stream, and wherein the information relating to the first media stream that is delivered to the server system comprises the context information.

24. A non-transitory computer-readable storage medium having stored thereon computer executable program code, which, when executed by a computer, causes the computer to:

receive from a user device first information relating to a first media stream captured at the user device;

identify a first virtual object based on second information relating to a second media stream that is delivered to a receiving device;

obtain object rendering data that is used to render the first virtual object;

determine, from the first information and the second information, transformational information that specifies one or more of spatial, geometric, and temporal transformations to be performed on the first virtual object; and provide the object rendering data and the transformational information to the user device, whereby one or more images of the first virtual object are rendered on the user device in accordance with the object rendering data and the transformational information.

* * * * *